US006000632A

United States Patent [19]

Wallace

[11] Patent Number: 6,000,632

[45] Date of Patent: Dec. 14, 1999

[54] POP-UP SPRINKLER HEAD WITH MAINTENANCE FEATURES

[76] Inventor: Rodney L. Wallace, 501 N.W. 103 Ave., Plantation, Fla. 33324

[21] Appl. No.: 09/060,358

[22] Filed: Apr. 15, 1998

[51] Int. Cl.[6] .............................. B05B 15/10; B05B 1/30; F16K 43/00

[52] U.S. Cl. .......................... 239/204; 239/201; 239/203; 239/205; 239/570; 239/572; 137/67; 137/68.11; 137/71; 137/329.1

[58] Field of Search .................................... 239/200, 201, 239/203, 204, 205, 569, 570, 572; 137/67, 68.11, 71, 329.1, 329.2, 329.4

[56] References Cited

U.S. PATENT DOCUMENTS

| | | | |
|---|---|---|---|
| 3,894,688 | 7/1975 | Reeder et al. | 239/570 X |
| 3,921,910 | 11/1975 | Hayes et al. | 239/205 |
| 3,977,063 | 8/1976 | Bruninga | 29/157 |
| 4,562,962 | 1/1986 | Hartman | 239/569 X |
| 4,609,146 | 9/1986 | Walto | 239/129 |
| 4,736,889 | 4/1988 | Stephenson | 239/572 X |
| 4,781,328 | 11/1988 | Robertson | 239/205 X |
| 4,840,312 | 6/1989 | Tyler | 239/205 |
| 4,848,661 | 7/1989 | Palmer et al. | 239/204 |
| 4,913,352 | 4/1990 | Witty et al. | 239/205 X |
| 5,004,157 | 4/1991 | Martell | 239/205 |
| 5,226,599 | 7/1993 | Lindermeir | 239/205 |
| 5,335,857 | 8/1994 | Hagon | 239/204 |
| 5,372,306 | 12/1994 | Yianilos | 239/570 X |
| 5,465,752 | 11/1995 | Higgins | 239/572 X |
| 5,524,824 | 6/1996 | Frimmer | 239/200 X |
| 5,762,270 | 6/1998 | Kearby et al. | 239/205 |

*Primary Examiner*—Andres Kashnikow
*Assistant Examiner*—Robin O. Evans
*Attorney, Agent, or Firm*—Alvin S. Blum

[57] ABSTRACT

A pop-up sprinkler head is provided with a mechanism that shuts off the water when the nozzle portion of the riser is removed for maintenance. A stopper element reciprocally mounted in the riser moves to a shut off position when the nozzle is removed. A valve seat member and a stopper element may be provided to retrofit the riser of an existing sprinkler head.

15 Claims, 2 Drawing Sheets

POP-UP SPRINKLER HEAD WITH MAINTENANCE FEATURES

BACKGROUND OF THE INVENTION

This invention relates to irrigation devices and more particularly to pop-up sprinkler heads with means for local water shut off for maintenance. Pop-up sprinklers may require maintenance to unclog an orifice, to clean out a filter or strainer, or to replace an outlet nozzle with one of a different range or to replace one that has been so abraded that its range has become excessive. When the nozzle portion is removed for maintenance, water floods out of the sprinkler head if the water supply to the unit has not been shut off. It is often awkward for the worker to access a shut off valve. After performing necessary maintenance to the head, the water supply must be turned on to see if function is correct. When the head is fed by a sector switching valve, it may be difficult to once again feed the head even if access to the water source is readily available. It would greatly facilitate maintenance of pop-up sprinkler heads if the water supply could be automatically shut off when the nozzle is removed and turned on when the nozzle is replaced.

SUMMARY OF THE INVENTION

It is accordingly an object of the invention to provide a means for stopping the flow of water from a pop-up sprinkler head when the nozzle portion is removed and for restoring flow when the nozzle portion is replaced. The invention comprises a pop-up sprinkler head with a housing fed by a pressurized water source, a riser mounted within the housing for reciprocating motion between a spring biased retracted position and a water pressure biased extended position. The riser has a riser body containing a stopper element and a valve seat. The stopper element reciprocates between a lower position in which there is no restriction of water flow and an upper position driven by water pressure that seats a valve member on the stopper element in the valve seat, shutting off the flow of water through the riser. A positioning member on the stopper element holds the stopper element in the lower position until the nozzle portion of the riser is partially or completely removed.

These and other objects, advantages and features of the invention will become apparent when the detailed description is studied in conjunction with the drawings, in which like characters refer to like elements in the various drawing figures.

DETAILED DESCRIPTION OF PREFERRED EMBODIMENTS

Figure 7:
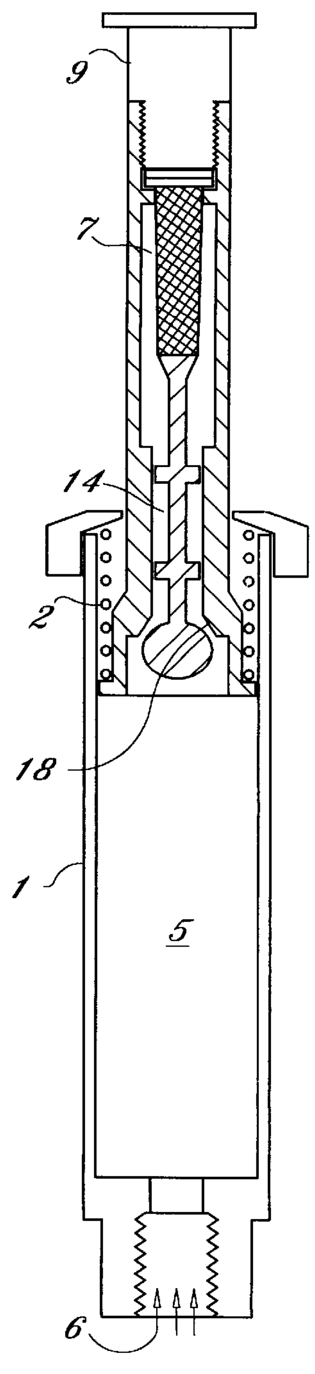
FIG. 7 is another embodiment of the invention in the same view as FIG. 2.
Figure 4:
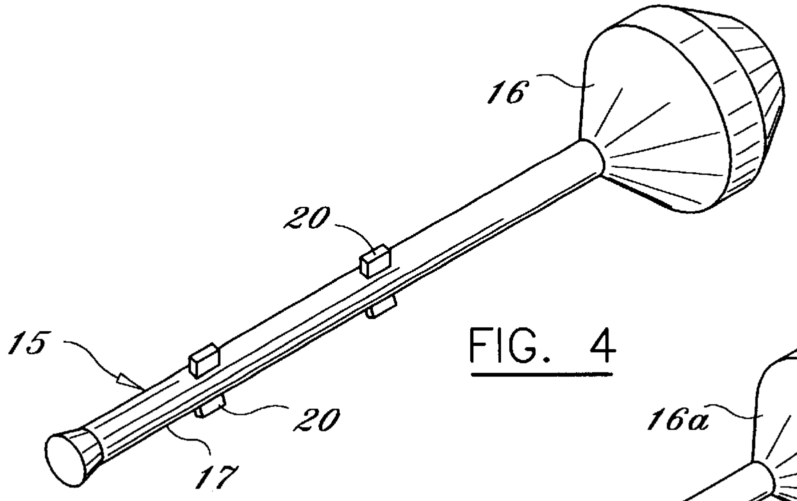
FIG. 4 is a perspective view of the stopper element.

Referring now first to FIGS. 1–4, a pop-up sprinkler head 30 has a housing 1 of conventional design with hollow interior passage 5. A riser 3 for directing liquid from the sprinkler is mounted within passage 5 for reciprocating motion between a spring biased retracted position (FIG. 1) and an extended sprinkling position (FIG. 2) under pressure from a water source applied at 6 with a force greater than that of spring 2. The riser has a riser body 4 with an internal passage 7. At the upper end 8 of the body is a female thread 10 of a length 11 for removable attachment of the nozzle portion 9 that may have various orifices and devices for dispersing the water flowing through passage 7. The conventional riser is improved by the items shown hatched in FIGS. 1–3. A valve seat member 13 has a sloping valve seat 18, and a central liquid passage 14. The member 13 is forced into passage 14 to form a seal at the inner wall 19 of the passage. Alternatively the valve seat 18 may be integral with the riser body 4 as shown in FIG. 7.

Figure 1:
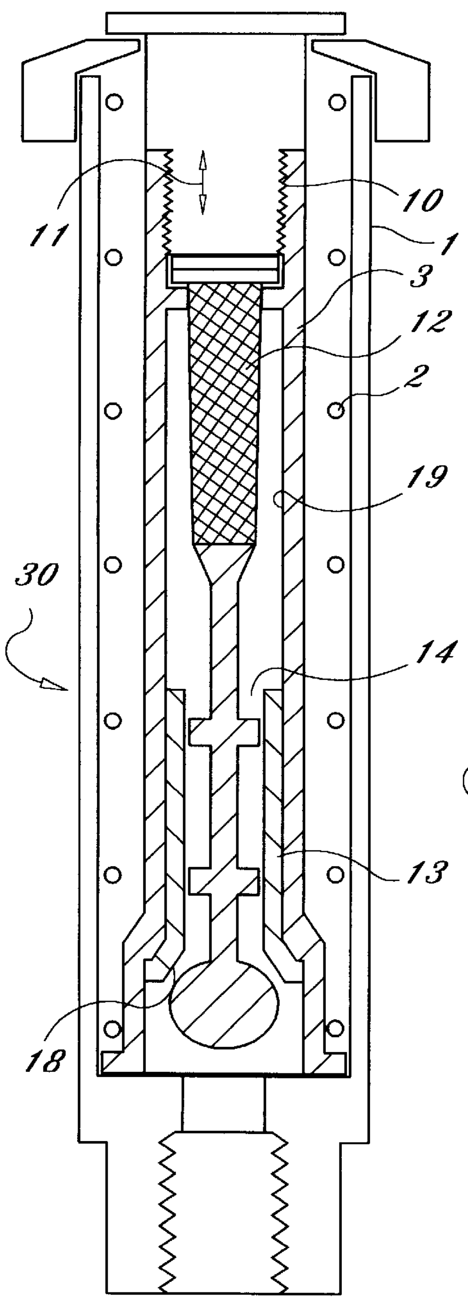
FIG. 1 is a sectional view of the sprinkler of the invention in the retracted position with new elements hatched.
Figure 2:
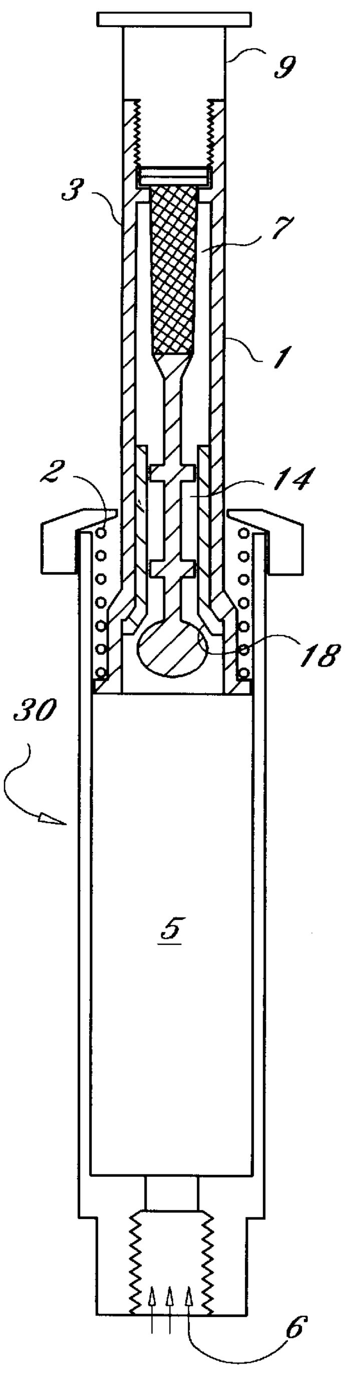
FIG. 2 is a view as in FIG. 1 in the extended position.
Figure 3:
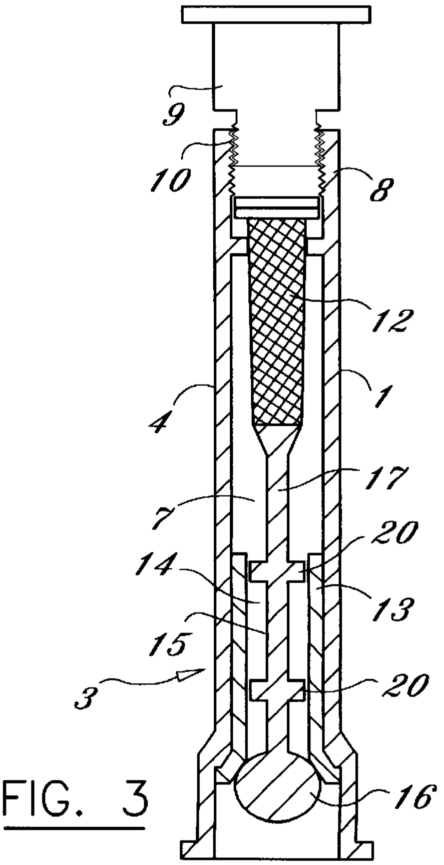
FIG. 3 is a view as in FIG. 1 of the riser after the nozzle portion has been partially unscrewed to illustrate the shutoff mechanism.

A stopper element 15 is mounted within the central liquid passage 14 for reciprocating axial motion between the open position shown in FIGS. 1 and 2 and the shut off position shown in FIG. 3. Stopper element 15 has a valve member 16 adapted for seating in sloping valve seat 18 to shut off water flow (FIG. 3). A positioning member 17 extends upward from valve member 16 and impinges on items above it to maintain the open position. As shown here, the riser may, but not necessarily, have a filter or screen 12 below the nozzle portion that positioning member 17 impinges upon. When the nozzle portion is unscrewed, water pressure forces stopper 15 upward until valve member 16 seats in seat 18, closing off the water flow. This occurs before the nozzle portion is completely unscrewed, thereby conserving water and protecting the worker. The riser may not contain a filter and the nozzle portion may be held on by other than screw thread such as the "bayonet" connection disclosed in U.S. Pat. No. 4,840,312 issued Jun. 30, 1989 to Tyler. The invention may be applied to these other designs as well.

The stopper 15 is provided with wings 20 extending radially outward from positioning member 17 to center member 17 in the passage 14.

Figure 6:
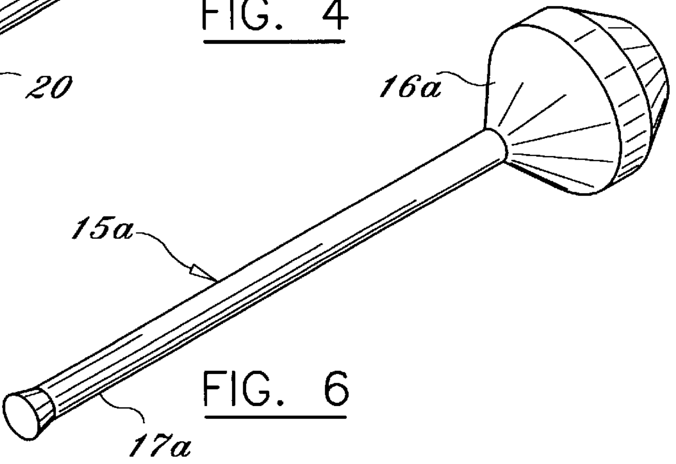
FIG. 6 is a perspective view of another embodiment of the valve seat member.
Figure 5:
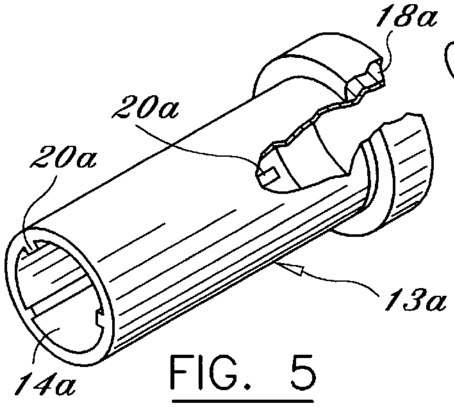
FIG. 5 is a perspective view of another embodiment of the stopper element.

In the alternative embodiment of the invention shown in FIGS. 5 and 6, the valve seat member 13*a* has a sloping valve seat 18*a* and an internal passage 14*a*. Centering wings 20*a* extend radially inwardly for centering the positioning member 17*a* so that it may be made without wings.

The valve seat member and stopper element may be provided as a package to retrofit an existing sprinkler head, or a new sprinkler head or riser incorporating the improvements may be provided.

The above disclosed invention has a number of particular features which should preferably be employed in combination although each is useful separately without departure from the scope of the invention. While I have shown and described the preferred embodiments of my invention, it will be understood that the invention may be embodied otherwise than as herein specifically illustrated or described, and that certain changes in the form and arrangement of parts and the specific manner of practicing the invention may be made within the underlying idea or principles of the invention.

What is claimed is:

1. A pop-up sprinkler for sprinkling a liquid, the sprinkler comprising:

A) a housing having a hollow interior;

B) a riser for directing liquid from the sprinkler, the riser being mounted in the hollow interior of the housing for reciprocating motion between an extended sprinkler position maintained by a certain liquid pressure in the housing and a retracted non-sprinkling position maintained by a spring applying a force less than that provided by said certain liquid pressure, the riser comprising:

i) a riser body having an interior passage for fluid flow therethrough, a lower end and an upper end;

ii) a nozzle portion with at least one orifice means for dispensing liquid therefrom, the nozzle portion threadably attached to the upper end of the body by a thread having a certain length;

iii) a filter means for removing particles from liquid passing through the riser, the filter means mounted in the riser body below the nozzle portion;

iv) a valve seat member having a central liquid passage and sealingly engaging the riser body interior passage;

v) a stopper element mounted within the interior passage for reciprocating axial motion, the stopper element having a valve member constructed for cooperating with the valve seat member for shutting off the central liquid passage from passage of liquid originating below the stopper, the stopper member being biased upwardly to a shutting off position solely by liquid pressure from below; and a positioning member attached to, and extending upwardly from, the valve member, the positioning member impinging upon the filter means when the nozzle portion is fully threaded on the riser body to prevent the valve member from sealingly engaging the valve seat member, the positioning member rising sufficiently to permit the valve member to sealingly engage the valve seat member and shut off the flow of liquid from below when the nozzle portion is partially unscrewed to less than the certain length but before the nozzle portion is completely unscrewed from the riser body, to thereby permit maintenance of the riser while liquid pressure is applied to the housing with the liquid shut off from flow through the riser.

2. The sprinkler according to claim 1, in which the valve seat member is integral with the riser body.

3. The sprinkler according to claim 1, in which the valve seat member and the stopper element are provided for retrofitting an existing sprinkler.

4. A riser for use in a housing of a pop-up sprinkler for sprinkling a liquid, the riser comprising:

A) a riser body constructed for reciprocating motion within said housing, and having an interior passage for liquid flow therethrough, a lower end and an upper end;

B) a nozzle portion for dispensing liquid therefrom, the nozzle portion being threadably attached to the upper end by a screw thread of a certain length;

C) a valve seat member having a central liquid channel, the valve seat member sealingly engaging the riser body interior passage;

D) a stopper element slidably mounted within the interior passage for reciprocating axial motion, the stopper element having a valve member constructed for sealingly cooperating with the valve seat member in an uppermost position for shutting off the central passage from passage of liquid from below, the stopper element being biased upwardly solely by liquid pressure from below; and E) a positioning member attached to, and extending upwardly from, the valve member, the positioning member having an upper extremity that impinges upon an item to prevent the valve member from rising to said uppermost position when the nozzle portion is threaded onto the body for the certain thread length, the item being advanced upwardly sufficiently to permit the valve member to rise to the uppermost and shut off position when the nozzle is partially unscrewed to less than the certain screw length but before the nozzle portion is completely unscrewed from the riser body to thereby facilitate maintenance of the riser while liquid pressure is applied.

5. The riser according to claim 4, in which the valve seat member is integral with the riser body.

6. The riser according to claim 4, in which the valve seat member and the stopper element are provided for retrofitting an existing sprinkler.

7. The riser according to claim 4, in which the valve seat member is a separate element that is fitted into the riser body.

8. The riser according to claim 4, in which said item is a filter element.

9. The riser according to claim 4, in which said item is the nozzle portion.

10. A riser for use in a housing of a pop-up sprinkler for sprinkling a liquid, the riser comprising:

A) a riser body constructed for reciprocating motion within said housing, and having an interior passage for liquid flow therethrough, a lower end and and upper end;

B) a nozzle portion for dispensing liquid therefrom, the nozzle portion being removably attached to the upper end;

C) a valve seat member having a central liquid channel, the valve seat member sealingly engaging the riser body interior passage;

D) a stopper element slidably mounted within the interior passage for reciprocating axial motion, the stopper element having a valve member constructed for sealingly cooperating with the valve seat member in an uppermost position for shutting off the central passage from passage of liquid from below, the stopper element being biased upwardly solely by liquid pressure from below; and E) a positioning member attached to, and extending upwardly from, the valve member, the positioning member having an upper extremity that impinges upon an item to prevent the valve member from rising to said uppermost position when the nozzle portion is attached onto the body, the item being advanced upwardly sufficiently to permit the valve member to rise to the uppermost and shut off position when the nozzle is detached from the riser body to thereby facilitate maintenance of the riser while liquid pressure is applied.

11. The riser according to claim 10, in which the valve seat member is integral with the riser body.

12. The riser according to claim 10, in which the valve seat member and the stopper element are provided for retrofitting an existing sprinkler.

13. The riser according to claim 10, in which the valve seat member is a separate element that is fitted into the riser body.

14. The riser according to claim 10, in which said item is a filter element.

15. The riser according to claim 10, in which said item is the nozzle portion.

* * * * *